United States Patent
Jangbarwala et al.

(10) Patent No.: US 6,998,054 B2
(45) Date of Patent: Feb. 14, 2006

(54) SELECTIVE FLUORIDE AND AMMONIA REMOVAL BY CHROMATOGRAPHIC SEPARATION OF WASTEWATER

(75) Inventors: Juzer Jangbarwala, Chino Hills, CA (US); Gerald Albert Krulik, San Clemente, CA (US)

(73) Assignee: The BOC Group, Inc., Murray Hill, NJ (US)

( * ) Notice: Subject to any disclaimer, the term of this patent is extended or adjusted under 35 U.S.C. 154(b) by 72 days.

(21) Appl. No.: 10/749,954

(22) Filed: Dec. 31, 2003

(65) Prior Publication Data

US 2005/0145572 A1    Jul. 7, 2005

(51) Int. Cl.
B01D 15/08    (2006.01)

(52) U.S. Cl. .................. 210/656; 210/682; 423/483; 423/488

(58) Field of Classification Search ............... 210/656, 210/659, 662, 682, 915; 423/483, 484, 488
See application file for complete search history.

(56) References Cited

U.S. PATENT DOCUMENTS

| | | |
|---|---|---|
| 3,700,592 A | 10/1972 | De Pree |
| 4,265,634 A | 5/1981 | Pohl |
| 4,375,568 A | 3/1983 | Izod et al. |
| 4,389,293 A | 6/1983 | Mani et al. |
| 4,995,956 A | 2/1991 | Mani et al. |
| 5,043,072 A | 8/1991 | Hitotsuyanagi et al. |
| 5,200,046 A | 4/1993 | Chlanda et al. |
| 5,207,914 A | 5/1993 | Lin |
| 5,651,883 A | 7/1997 | Horwitz et al. |
| 5,707,514 A | 1/1998 | Yamasaki et al. |
| 5,725,753 A | 3/1998 | Harada et al. |
| 5,733,434 A | 3/1998 | Harada et al. |
| 5,876,685 A | 3/1999 | Krulik et al. |
| 5,951,874 A | 9/1999 | Jangbarwala et al. |
| 6,582,605 B1 | 6/2003 | Krulik et al. |
| 6,613,230 B1 | 9/2003 | Krulik et al. |

*Primary Examiner*—Ernest G. Therkorn
(74) *Attorney, Agent, or Firm*—David A. Hey

(57) ABSTRACT

A process for fluoride removal from wastewater streams produced during industrial operation for further industrial use or to comply with environmental regulations. The process segregates the removal of fluoride and fluorosilicate ions, from the totality of ions in the waste water stream, thus improving treatment efficiency and reducing costs. Ion-exchange chromatography is used to remove the fluoride and fluorosilicate ions by passing the wastewater stream through one or more columns that contain a charged resin which selectively binds cations/anions in the stream. The fluoride ions are washed from the column and then collected for removal or use in other processes.

15 Claims, 1 Drawing Sheet

SELECTIVE FLUORIDE AND AMMONIA REMOVAL BY CHROMATOGRAPHIC SEPARATION OF WASTEWATER

BACKGROUND

Many industrial operations utilize fluoride, often as hydrofluoric acid or as fluoride salts such as ammonium fluoride. For example, alumina and silica etching, cleaning, etc. and semiconductor production utilize large amounts of hydrofluoric acid, and other fluoride compounds. As a regulated element in water discharge, for reasons well known in the art, the wastewater generated needs to be processed for fluoride ion removal. Additionally, when using hydrofluoric acid (HF), semiconductor manufacturers often require an ultra-pure hydrofluoric acid.

The typical semiconductor manufacturer may produce an average of 10,000 gallons per day of mixed acidic fluoride waste. The production of such vast quantities of fluoride ion waste, however, presents significant disposal problems. Fluoride wastes are becoming subject to increasingly stringent environmental controls for treatment and disposal. Industry must therefore greatly reduce the fluoride content of waste solutions before the solutions may be introduced into the municipal water disposal system.

With the increased use of fluorine as a chamber cleaning gas, the volumes of waste are expected to increase. The state-of-the-art practices for fluoride treatment have focused on precipitation of fluoride as an insoluble calcium fluoride ($CaF_2$) salt by treating the dilute streams with either direct calcium hydroxide addition ($Ca(OH)_2$) or forming calcium hydroxide by addition of calcium chloride ($CaCl_2$) and sodium hydroxide (NaOH).

The reaction proceeds as follows:

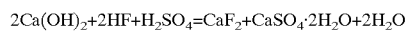

As can be seen from the reaction, on a dry weight basis, the sludge would contain only 45% calcium fluoride ($CaF_2$), the balance being relatively benign $CaSO_4$.

This treatment scheme suffers from several drawbacks. Solubility of ($Ca(OH)_2$) in water is approximately 1,600 ppm. Therefore, addition of $Ca(OH)_2$ typically results in the injection of a slurry of $Ca(OH)_2$. The slurry has 10–15 micron size particles of $Ca(OH)_2$ that act as the seed for calcium fluoride ($CaF_2$) precipitation. The sulfates present in the water also precipitate since calcium sulfate ($CaSO_4$) is not very soluble. Also as $CaSO_4$ has two molecules of water attached to the salt molecule, the precipitated solid is very sticky, and does not filter well in the filter press. As a result, filter press operations may need to be stopped prematurely due to pressure build-up, resulting in excessive amounts of moisture being left in the cake. A further limitation of these systems has been the level of fluoride ion concentration that they can achieve. Typically, at slightly alkaline pH, approximately 20 parts per million (ppm) of $CaF_2$ is still soluble in the water. At excessive dosage levels of reactants, especially the calcium and alkalinity source, lower levels of 10–12 ppm of fluoride can be achieved. However, in some areas of the world, the discharge limits for fluoride are being lowered to sub 2-ppm levels. This level cannot be technically achieved by the precipitation mechanism due to the lower solubility limit of $CaF_2$.

In addition, it is very difficult for the semiconductor manufacturer to recycle the fluoride after this process has been used, because caked calcium fluoride also contains high amounts of silicon as silica, which is difficult to separate from fluoride. As silica has adverse effects on many semiconductor manufacturing processes, its presence in the caked calcium fluoride negates its value as a raw material. Therefore, all of the fluoride from conventional fluoride caking systems is unusable by semiconductor manufacturers, because it is unavailable for recycle or recovery.

In addition to the above problems, the industry desires a way to isolate and treat the waste streams containing ammonium ions. Current state-of-the-art employs biological filters which require much maintenance and are not very efficient.

U.S. Pat. No. 5,876,685 discloses a method for the removal and purification of substantially all the fluoride ions contained in a solution containing greater than 10 parts per million (ppm) fluoride ion, a mixture of other anions, silicon in the form of a fluorosilic acid, silicic acid, silicates, or silicon tetrafluoride, and optionally also containing complex metal fluorides, to produce a hydrofluoric acid.

SUMMARY

A process for treating a wastewater stream is provided, which includes removing substantially all fluoride ions contained in the wastewater stream, and comprises exchanging cations in the wastewater stream with hydrogen ions by passing the wastewater stream through a strong acid cation resin, removing hexafluorosilicates from the wastewater stream by passing the wastewater stream through a strong base anion resin in sulfate form, removing acids from the wastewater stream by passing the wastewater stream through a weak base anion resin, having tertiary amine groups in free base form, and removing hydrofluoric acid from the wastewater stream by passing the wastewater stream through a weak base anion resin in free base form.

A process for treating a wastewater stream is also provided which includes removing substantially all fluoride ions contained in the waste water stream, and comprises exchanging hydrogen ions in a strong acid cation resin containing hydrogen ions with aluminum ions by passing a solution of aluminum salt through the strong acid cation resin, rinsing the strong acid cation resin with water, and removing hydrofluoric acid from the wastewater stream by passing the wastewater stream through the strong acid cation resin.

DETAILED DESCRIPTION

Figure 1:
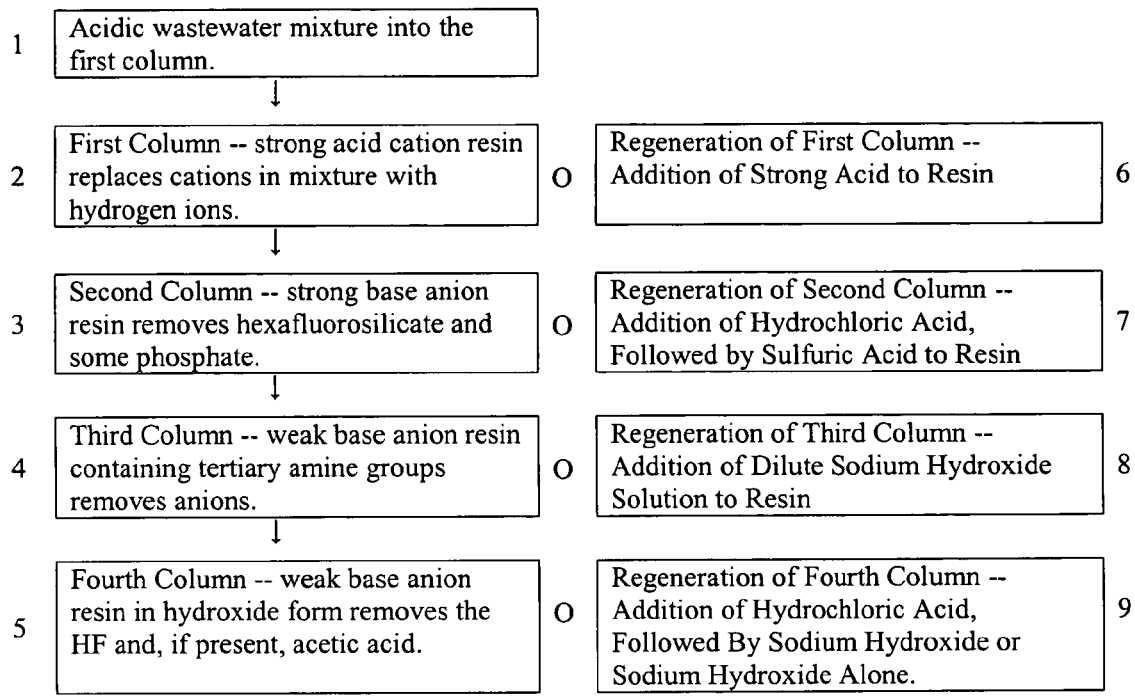
FIG. 1 is a flow chart of the process according to one embodiment.

The subject process is applicable for fluoride removal from wastewater streams produced during industrial operation for further industrial use or to comply with environmental regulations. The process segregates the removal of fluoride and fluorosilicate ions, from the totality of ions in the waste water stream, thus improving treatment efficiency and reducing costs. Ion-exchange chromatography is used to remove the fluoride by passing the wastewater stream through one or more columns that contain a charged resin which selectively binds cations/anions in the stream. The fluoride is washed from the column and is then collected for removal or use in other processes.

In one embodiment the fluoride ($F^-$) waste is separated from a mixed acid waste stream by flowing the mixed acid waste stream through a four stage (column) ion chromatography exchange separation process. The first column converts any salts in the stream to the corresponding acids by exchanging cations such as ammonium with hydrogen ions. The second preconditioned column selectively removes the hexafluorosilicates ($SiF_6$), while the third column removes the acids—nitric acid ($HNO_3$), acetic acid (HOAc), hydrochloric acid (HCl) and sulfuric acid ($H_2SO_4$) by chromatographic separation. The fourth column removes only hydrofluoric acid (HF). This process facilitates the treatment of a concentrated stream as a batch, containing only fluoride compounds, eliminating the extra sludge generated by sulfates and overdosing of calcium hydroxide ($Ca(OH)_2$) due to continuous operation.

In the first column, the wastewater stream is treated by a strong acid cation resin with sulfonic acid moieties such as polystyrene crosslinked with di-vinyl benzene, an example of such a resin is Purolite C-100 (Purolite Company, Bala Cynwyd, Pa.). It should be noted that many strong cation resins could be used in this process. This column exchanges all cations in the wastewater stream with hydrogen ions. The resulting wastewater stream contains dilute concentrations of: sulfuric acid, nitric acid, acetic acid, hydrochloric acid, hydrofluoric acid and fluorosilicic acid. The column is equipped with either an ammonium ion monitor or a differential pH monitor. If the ammonium ion monitor is used, a leakage of ammonium ions indicates column exhaustion and the column can be regenerated with a strong acid. The choice of the strong acid used during regeneration is decided by the user. If the user is inclined to ship the regenerant waste, the column can be regenerated with sulfuric acid, which generates an ammonium sulfate salt solution that could be sold to the fertilizer industry. If the user is inclined to destroy the ammonium on-site, the column can be regenerated with hydrochloric acid, and the regenerant waste treated in an electrolytric chamber under the influence of DC current, to change the chlorides to hypochlorite, which then reacts with the ammonia, to eventually convert it to nitrogen gas through the mono-, di-, and tri-chloramine reaction process.

In the second column, the acidified wastewater stream is treated with a strong base anion containing quaternary amine groups, such as polystyrene crosslinked with di-vinyl benzene. An example of such a resin is Purolite A-400, or A-600 (Purolite Company, Bala Cynwyd, Pa.). This resin is treated with sulfuric acid to leave the resin in the sulfate form, rather than in the more-standard hydroxide form. It should be noted that any type of strong base sulfate anion resins that can dissociate salts into acids by removing the cation and replacing it with hydrogen ion (splitting salts), can be used. The divalent sulfate ions prevent any of the other anions in the wastewater stream from being absorbed by the resin, except for anions that have a higher equivalent weight. An example of one such anion would be the hexafluorosilicate ion, formed from the silicon or silicon dioxide portions of the semiconductor wafer and the presence of HF. The equivalent weight of the $SiF_6$ is 71 compared to 48 for sulfates. The resin exchanges ($SiF_6$) for sulfates, producing sulfuric acid in place of the fluorosilicic acid. The column can be equipped with a silica monitor for monitoring silica breakthrough, signaling the need for regeneration. Regeneration may be a two-stage process comprising first adding hydrochloric acid, followed by sulfuric acid, to the strong sulfate base anion. The regenerant waste is collected, and treated in a small batch treatment system with very slow addition of calcium hydroxide, or calcium chloride and sodium hydroxide (NaOH) to precipitate a mixture of calcium silicate ($CaSiO_3$), silica, and $CaF_2$. The sludge can then be pressed and disposed of.

In the third column, the treated wastewater stream from the second stage contains all the acids with no cations, and no hexafluorosilicates. This wastewater stream is treated for removal of acids other than HF. The resin used in the column is a weak base anion containing tertiary amine groups that are in free base form. That is, the exchangeable anion on the resin is hydroxide ion, thus free base, since no soluble cation is associated with it. The only cation is the insoluble ion exchange resin. An example of such a resin is Purolite A-845 (Purolite Company, Bala Cynwyd, Pa.). It should be noted that most weak base anion resins, whether with partial strong base groups or not, can be used.

HF is initially absorbed in place of the hydroxide ions on the resin, along with all the other acids. Therefore, initially, the column effluent has very low conductivity, (deionized quality water), indicating that substantially all acids are being absorbed. This low conductivity condition persists until all of the hydroxide ions are essentially replaced by the anions in the waste stream. Since the equivalent weight of HF is the lowest among the acids mentioned above as coming from the second stage resin treatment, HF becomes displaced as the higher equivalent weight acids enter the column. This results in the treated wastewater stream consisting almost exclusively of dilute HF. To detect when the resin is exhausted (ie, when the next most loosely held ion than HF is being displaced), the column may have a chloride monitor that checks for the presence of chloride ions in the effluent stream. The chloride ions indicate that the column can no longer produce exclusively HF effluent, which signals the need for regeneration of the resin. The resulting wastewater stream is then treated by the fourth stage.

Regeneration comprises pumping a very dilute NaOH solution through the third stage resin. The amount of NaOH may be approximately 110% of the stoichiometric value required for complete replacement with hydroxide ion. The waste from the regeneration includes mostly sodium salts of sulfates, chlorides, nitrates, and can be discharged to any standard acid waste neutralization system. It should be noted that acetic acid, which is a very weak acid, will be released before chlorides by the column if it is present in the wastewater.

The fourth column removes HF from the wastewater stream by using any weak base anion resin in hydroxide form such as Purolite A-845, or Purolite A-103 (Purolite Company, Bala Cynwyd, Pa.) which can be used for this process. Another example of such a resin is the Reillex 425P polymer, (Reilly Industries, Indianapolis, Ind.). This resin has demonstrated very high HF absorption capacity. (2.5 equivalents per liter volume of wet resin as supplied (eq/l) vs 1.6 eq/l for other weak base anion resins). The resin would initially produce deionized water, as it absorbs substantially all acetic acid which might be present, as well as substantially all the HF. However, as more HF contacts the resin, the acetic acid will be replaced by the HF, and the effluent stream will contain acetic acid. This stream can be sent to the acid waste neutralization system.

Regeneration of this column can have different configurations, based on user needs. If the user wants to reuse the water, then a conductivity monitor is installed at the effluent port, which signals the need for regeneration, by measuring the electrical resistance of the water, which is controlled by the total number of ions in the water. Once an ion exchange resin is exhausted, it can no longer absorb ions so the conductivity of the exit water increases. If the user is not interested in the reuse of water, and wants maximum fluoride removal, the column may be equipped with a fluoride ion monitor to signal the need for regeneration. In either case, the regeneration may be done with hydrochloric acid to produce an acidic HF solution, followed by NaOH to regenerate the resin, or the regeneration can be done with only NaOH, to give a NaF/NaOH mixture. When the HCl elution wave is separated, the waste consists mostly of HF. The HF waste will be collected in a tank and batch treated by adding $Ca(OH)_2$ at a concentration below the $Ca(OH)_2$ solubility limits, to allow for calcium fluoride ($CaF_2$) crystals to grow without $Ca(OH)_2$ crystal seeds. Alternatively, calcium chloride ($CaCl_2$) can be added in stoichiometric amounts, with the pH being adjusted to maintain an optimum $CaF_2$ solubility. In some embodiments, the pH value would be between about 4 to about 5. The $CaF_2$ crystals thus formed are extremely easy to filter, and the sludge is effectively concentrated, as it contains very little water.

In one embodiment, a system employing a cation exchange resin, with all available cation capacity filled by aluminum ions, is used to purify wastewater streams containing fluoride ions. The resin is used for selectively removing fluoride ions in wastewater by facilitating the complexation reaction of aluminum ions with fluoride ions, within the reactive matrix of the ion exchange resin. The system is suitable for use in neutral or slightly alkaline pH wastewater, such as is found at the discharge end of a conventional fluoride precipitation system.

The following embodiment described below allows the user to produce lower levels of fluoride in the wastewater. The process includes using a strong acid cation ion exchange resin, with certain embodiments having a uniform particle size, as a chelating agent for the formation of the aluminum fluoride complex within the reactive matrix of the resin. In other embodiments, the resin has a non-uniform bead size. Examples of resins with non-uniform bead size comprise: IR 120, (Rohm & Haas Co., Philadelphia, Pa.); Purolite C-100, (Purolite Company Bala Cynwyd, Pa.). Examples of resins with uniform bead size resin are Purolite PFC-100, (Purolite Company Bala Cynwyd, Pa.); Marathon series, (Dow Chemical Company Midland, Mich.); and Amberjet series, (Rohm & Haas, Co. Philadelphia, Pa.).

In one embodiment, strong acid cation resin containing hydrogen ions is subjected to a solution of soluble aluminum salt, such as aluminum chloride or aluminum sulfate. It should be noted that any soluble salt of aluminum can be used. In one embodiment, the amount will be about 1 to about 3 equivalents of aluminum, as aluminum per liter of resin. In another embodiment, the amount would be that which would be very close to the tested resin capacity for aluminum, currently estimated at 1.2 equivalents per liter. The hydrogen ion from the resin is exchanged with the aluminum ion, and a strong acid with a slight residual of the aluminum salt is generated as the effluent from the column. In one embodiment, a volume of one bed volume of aluminum salt solution will be used. The column is then rinsed with approximately one bed volume of deionized water.

The total waste from the soluble aluminum salt solution passed through the strong acid cation resin and deionized water that rinsed the strong cation resin in the column is collected and saved in a tank.

Concentrated mineral acid, corresponding to the anion of the aluminum salt passed through the strong acid cation resin is added to the soluble aluminum salt solution which passed through the strong acid cation resin and deionized water that rinsed the strong cation resin in the column is regenerated using a strong acid solution of 6% by weight. As an example, if aluminum chloride is used as the salt, hydrochloric acid would be used as a regenerant.

A wastewater stream containing fluoride ions is passed through the column at a volumetric rate of about 16 bed volumes per hour, or roughly 2 gallons per minute (gpm)/per cubic foot of resin. A fluoride ion detector may signal the exhaustion of the column.

The regenerant waste is collected and sent back to the precipitation system for processing with either calcium hydroxide, or calcium chloride plus sodium hydroxide, as previously described, to precipitate a mixture of calcium fluoride, aluminum hydroxide, and calcium aluminate salts. To repeat the process, soluble aluminum salt solution is added to the strong acid cation resin.

System configurations can vary with user requirements. In one embodiment, the configuration has three columns of strong acid cation resin in a Primary-Polisher-Standby design. During the service cycle, the wastewater stream flows first through the Primary column and second through the Polisher column. A fluoride sensor monitors the effluent from the Primary column and signals exhaustion of the Primary column. At this point, the wastewater stream is channeled to pass through the Polisher column next, followed by the Standby column. After the wastewater stream is passed through, the Primary column is regenerated by pumping the concentrated mineral acid corresponding to the anion of the aluminum salt passed through the strong acid cation resin. After regeneration is complete, the regenerated Primary column becomes the new Standby column.

In another embodiment, the configuration has two trains (one in service, one in standby) of two columns each, with one column being a Primary and the other a Polisher column. When fluoride is detected by a fluoride detector in the effluent of the Primary column, the wastewater flow is switched to the standby train, and the exhausted train is regenerated with concentrated mineral acid as described previously. The mineral acid (regenerant) is pumped through the Polisher column first, and then through the Primary column.

FIG. 1 illustrates the general process of one embodiment wherein an acidic wastewater mixture containing at least some of the following ions: sulfate, chloride, fluoride, acetate, ammonium, hydrogen, nitrate, phosphate, hexafluorosilicate, silicate, sodium, potassium, organic amines, tetramethylammonium is introduced into the first column 1. The wastewater passes through the first column where a strong acid cation resin removes substantially all cations such as, ammonium, sodium, potassium, tetramethylammonium and replaces the cations with hydrogen ions, making the exiting wastewater strongly acidic 2. Resin exhaustion in the first column is signaled by no pH drop between entrance and exit from the first column. The wastewater from the first column enters the second column wherein hexafluorosilicate and some phosphate is removed using a strong base anion containing quaternary amine resin in sulfate form 3. Exhaustion of the resin in the second column is measured by using a silica analyzer on the effluent. All other acids, except for some phosphate, pass through with the wastewater to the third column.

The third column removes substantially all anions to give, initially, deionized water by using a weak base anion resin containing tertiary amine groups that are in free base form 4. Once the resin is completely loaded with anions, additional anions will displace any fluoride that is absorbed on the resin. The effluent consists of substantially only HF, and acetic acid if any is present in the initial wastewater, until there is little or no absorbed HF left on the resin. As this happens chloride ions will pass through in addition to the acetate and HF; indicating resin exhaustion. The HF ions, and if present acetic acid, from the effluent wastewater of column three are removed in column four using any weak base anion resin in hydroxide form 5. A fluoride analyzer may be used to monitor the exiting solution to determine when the resin is exhausted.

The first column can be regenerated with sulfuric acid 6, which generates an ammonium sulfate salt or hydrochloric acid. The second column, can be regenerated 7 using a two-stage process comprising first adding hydrochloric acid, followed by sulfuric acid, to the strong sulfate base anion resin. Regeneration of the third column 8 comprises pumping a very dilute NaOH solution through the third stage resin. The regeneration of the fourth column 9 may be done with hydrochloric acid to produce an acidic HF solution, followed by NaOH to regenerate the resin, or the regeneration can be done with only NaOH, to give a NaF/NaOH mixture.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further all embodiments disclosed are not necessarily in the alternative, as various embodiments of the invention may be combined to provide the desired characteristics.

We claim:

1. A process for treating a wastewater stream, including removing substantially all fluoride ions contained in the wastewater stream, comprising:
    a. exchanging cations in the wastewater stream with hydrogen ions by passing the wastewater stream through a strong acid cation resin;
    b. removing hexafluorosilicates from the wastewater stream by passing the wastewater stream through a strong base anion resin in sulfate form;
    c. removing acids from the wastewater stream by passing the wastewater stream through a weak base anion resin, having tertiary amine groups in free base form;
    d. removing hydrofluoric acid from the wastewater stream by passing the wastewater stream through a weak base anion resin in free base form.

2. The process of claim 1 wherein the acids other than hydrofluoric acid are selected from the group consisting of $HNO_3$, HOAc, HCl, and $H_2SO_4$.

3. The process of claim 1 wherein the strong acid cation resin contains sulfonic acid moieties.

4. The process of claim 1 further comprising monitoring the wastewater stream passing through the strong acid cation resin to test for ammonium ion breakthrough.

5. The process of claim 4 wherein said monitoring comprises monitoring the differential pH of the wastewater stream entering and exiting the resin.

6. The process of claim 1 further comprising regenerating the strong acid cation resin by passing through the strong acid cation resin, at least one of sulfuric acid or hydrochloric acid.

7. The process of claim 1 wherein the strong base anion resin contains quaternary amine groups.

8. The process of claim 1 wherein part b further comprises monitoring the wastewater stream passing through the strong base anion resin to test for silica breakthrough.

9. The process of claim 1 wherein part b further comprises regenerating the strong base anion resin by passing through the strong base anion resin, hydrochloric acid followed by sulfuric acid.

10. The process of claim 1 wherein part c further comprises monitoring the wastewater stream passing through the strong base anion resin to test for chloride breakthrough.

11. The process of claim 1 wherein parts c and d further comprise regenerating the weak base anion resin having tertiary amine groups in free base form with a sodium hydroxide solution.

12. The process of claim 1 wherein part d further comprises monitoring the wastewater stream passing through the weak base anion resin to test for electrical resistance.

13. The process of claim 1 further comprising monitoring the wastewater stream passing through the strong base anion resin to test for fluoride breakthrough.

14. The process of claim 1 further comprising regenerating the weak base anion resin by passing hydrochloric acid through the weak base anion resin.

15. The process of claim 1 further comprising adding to the removed hydrofluoric acid, at least one of $Ca(OH)_2$ at a concentration below solubility limits or $CaCl_2$.

* * * * *